United States Patent [19]

Snider

[11] 4,306,604

[45] Dec. 22, 1981

[54] TRACTION-INCREASING ATTACHMENT FOR DISK-TYPE VEHICLE-WHEELS

[76] Inventor: Ted E. Snider, 615 N. Plum, Havana, Ill. 62644

[21] Appl. No.: 130,211

[22] Filed: Mar. 14, 1980

[51] Int. Cl.³ .............................................. B60C 27/20
[52] U.S. Cl. ............................... 152/225 R; 301/41 R
[58] Field of Search ..................... 152/225 R, 226–228; 301/41 R, 44 R, 44 T, 43

[56] References Cited

U.S. PATENT DOCUMENTS

| | | | |
|---|---|---|---|
| 1,482,349 | 1/1924 | Cross | 301/44 T |
| 2,524,973 | 10/1950 | Hammond et al. | 152/225 C |
| 2,625,194 | 1/1953 | Westrate | 152/225 C |
| 4,129,161 | 12/1978 | Quintana | 152/225 R |

Primary Examiner—H. Grant Skaggs
Attorney, Agent, or Firm—Ralph F. Staubly

[57] ABSTRACT

A traction-increasing attachment for driven vehicle-wheels has at least one L-shaped rigid member for extending diametrically over the face of a disk-type wheel and has a cleat-like extension extending transversely over the tire tread of the wheel. A quickly and easily mountable and demountable support member diametrically spans the face of the wheel and has anchoring fingers receivable in conventional slots in the wheel adjacent its tire-receiving rim. The support member can be formed of two length-adjustable straps or it can be a slightly bowed single strap, which, when straightened by being assembled with the wheel, has its ends thereby extended to anchor in the wheel slots.

2 Claims, 6 Drawing Figures

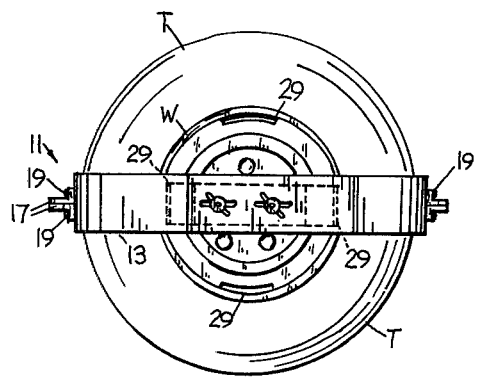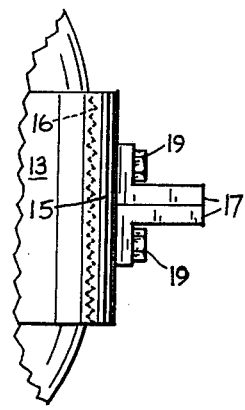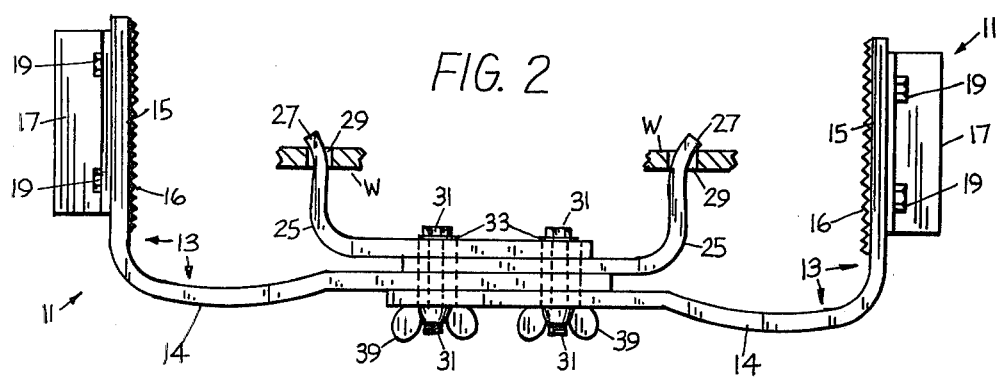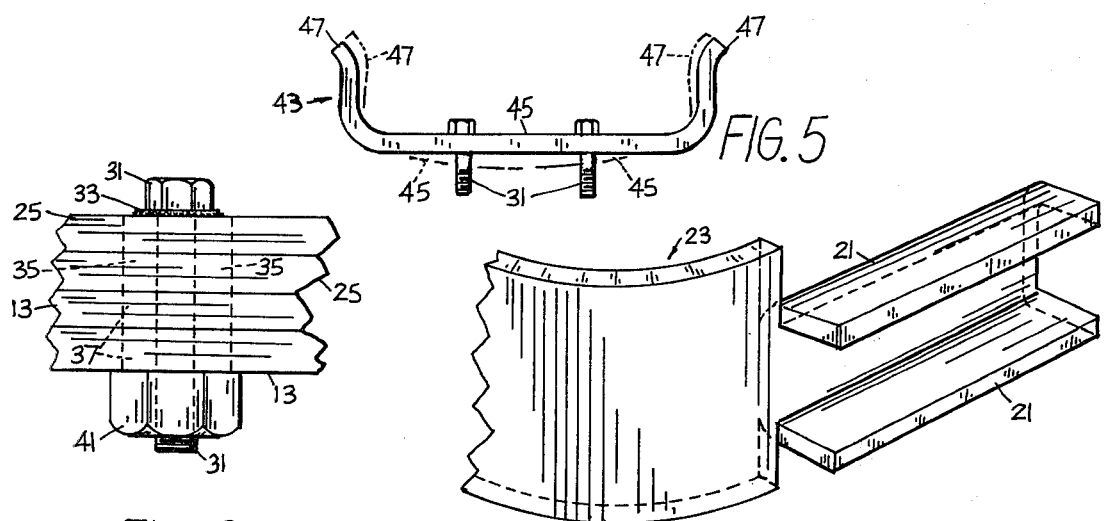

TRACTION-INCREASING ATTACHMENT FOR DISK-TYPE VEHICLE-WHEELS

BACKGROUND AND OBJECTS OF THE INVENTION

It is known to provide traction-increasing attachments for the power-driven wheels of automotive vehicles, e.g. U.S. Pat. Nos. 963,667 (Vergote), 1,588,065 (Thomsen), and 4,036,272 (Lee). But none is known which has at least one rigid cleat-carrying member diametrically spanning the face of a conventional disk-type wheel and attached thereto by an easily and quickly mountable and demountable member diametrically backing said rigid member and anchored to said wheel by fingers extending through and expanded behind conventional slots in the margins of said wheel. It is the principal object of the invention to provide such a device. Other objects and advantages will appear as the following detailed description proceeds.

BRIEF DESCRIPTIONS OF THE DRAWING FIGURES

FIG. 1 is a side elevational view of a preferred embodiment of the invention.

FIG. 1A is an enlarged fragmentary view of the right seventh of FIG. 1.

FIG. 2 is an enlarged plan view of the device of FIG. 1.

FIG. 3 is an enlarged fragmentary view showing the parts assembled by using the standard lug nuts of the wheel instead of added wing nuts.

FIG. 4 is an enlarged fragmentary perspective view of a modified cleat portion of the device.

FIG. 5 is a plan view of a one-piece (bowed) species of the hub-spanning support member.

DETAILED DESCRIPTION

With reference now to the drawings, the numeral 11 generally designates a preferred embodiment of the clamp-on device for increasing traction in snow or mud. The device 11 is shown in FIGS. 1 and 2 as having two cleat-carrying rigid members 13, but it is contemplated that the device can be made, or can be used, with only one member 13.

The L-shaped members 13 can be formed from relatively rigid straps of steel, aluminum alloys or fiber-reinforced plastics, etc. They are desirably bent to provide tire-tread-overlying extensions 15. In FIGS. 1 and 2 the extensions 15 have cleat-forming pairs of angle bars 17 fixed thereto by threaded machine screws 19 (or by welding).

In FIG. 4 the cleats are shown as being differently formed by ribs 21 bent-out from the edges of the tread-overlying part of the L-shaped strap 23.

The L-shaped straps 13 (FIGS. 1 and 2) have stem portions 14 and cleat-like base portions 15, and are attached to a conventional disk-type wheel W by a mounting device of shallow U-shaped configuration formed of two roughly L-shaped rigid strap elements 25. The elements 25 have short outwardly bent anchoring tips 27 adapted to extend through the usual rim-paralleling slots 29 formed close to the rim of the wheel W. The left element 25 is apertured to receive the shanks of a pair of machine screws 31 the heads of which are desirably welded at 33 to the left element 25. The other element 25 has longitudinally elongated slots 35 (FIG. 3) formed therein for in-situ length adjustment of the mounting device (formed by the elements 25) for easier and firmer attachment thereof to the wheel W. The rigid cleat-carrying members 13 also have similar longitudinally elongated slots 37 to permit their length-adjustment so that their cleat-carrying portions can be made to seat against the tread of the tire T.

The members 13 and the elements 25 are clamped together by wing nuts 39 (FIGS. 1 and 2) or by conventional lug nuts 41 (FIG. 3). Extensions 15 have tire-gripping corrugations 16.

FIG. 5 discloses a modified (one-piece) form 43 of the mounting device in which the bight portion 45 thereof is slightly bowed and is sufficiently flexible to be length-adjustably flattened by the in situ action of the not-shown parts-interconnecting machine screws and nuts (like 31 and 39 or 41 in FIGS. 2 and 3). The flattening of portion 45 will cause the slot-engaging tips 47 to expand outwardly to pass through and engage behind the slots 29 in the wheel W.

The invention having been described, what is claimed is:

1. A quickly and easily mountable and demountable attachment for a disk-type drive wheel of an automotive vehicle, comprising: at least one generally L-shaped relatively rigid bar, said bar having a good-traction-providing cleat-like base portion for transversely overlying the tread of a tire mounted on said wheel, and having a stem portion for transversely spanning the central area of said wheel; a U-shaped member backing said stem portion and having tongues at its ends for anchoringly engaging in transversely opposite already-present rim-paralleling slots adjacent the rim of said wheel; and means for fastening said stem portion to its backing and supporting U-shaped member, the medial portion of said U-shaped member having two overlapped reaches, one of which has elongated slots to receive said means for length adjustability of said U-shaped member to wheels having differently spaced slots, said fastening means comprising (a) at least two threaded posts attached to said U-shaped member and extending through apertures in said stem portion, and (b) nuts engageable with the threads of said posts.

2. A quickly and easily mountable and demountable attachment for a disk-type drive wheel of an automotive vehicle, comprising: at least one generally L-shaped relatively rigid bar, said bar having a good-traction-providing cleat-like base portion for transversely overlying the tread of a tire mounted on said wheel, and having a stem portion for transversely spanning the central area of said wheel; a U-shaped member backing said stem portion and having tongues at its ends for anchoringly engaging in transversely opposite already-present rim-paralleling slots adjacent the rim of said wheel; and means for fastening said stem portion ot its backing and supporting U-shaped member, the medial portion of said U-shaped member being somewhat flexible and being bowed, whereby the tips of is tongues are more easily insertable into said slots and whereby the tips of said tongues will better overlie the margins of said slots when said bowed portion is straightened as said fastening means are tightened, said fastening means comprising (a) at least two threaded posts attached to said U-shaped member and extending through apertures in said stem portion, and (b) nuts engageable with the threads of said posts.

* * * * *